(12) United States Patent
Platz

(10) Patent No.: US 12,217,407 B2
(45) Date of Patent: Feb. 4, 2025

(54) METHOD FOR AUTOMATICALLY ASSISTING WITH AN INSPECTION AND/OR CONDITION MONITORING OF OBJECTS

(71) Applicant: Siemens Aktiengesellschaft, Munich (DE)

(72) Inventor: Axel Platz, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 523 days.

(21) Appl. No.: 17/555,046

(22) Filed: Dec. 17, 2021

(65) Prior Publication Data
US 2022/0198646 A1 Jun. 23, 2022

(30) Foreign Application Priority Data
Dec. 21, 2020 (DE) .......................... 102020216401.0

(51) Int. Cl.
*G06T 7/00* (2017.01)
*G06T 7/70* (2017.01)
*G06T 17/00* (2006.01)

(52) U.S. Cl.
CPC .............. *G06T 7/0004* (2013.01); *G06T 7/70* (2017.01); *G06T 17/00* (2013.01)

(58) Field of Classification Search
CPC ......... G06T 7/0004; G06T 7/70; G06T 17/00; G05B 23/0272; G05B 2219/31316; G05B 2219/31318; G05B 2219/37079; G05B 2219/37205; G05B 2219/37206; G05B 19/4183; G05B 19/41875; Y02P 90/02
See application file for complete search history.

(56) References Cited

U.S. PATENT DOCUMENTS

| | | | |
|---|---|---|---|
| 7,882,394 B2* | 2/2011 | Hosek | G06F 11/008 |
| | | | 714/48 |
| 7,973,794 B2* | 7/2011 | Forney | G06F 21/105 |
| | | | 700/27 |
| 2010/0111370 A1* | 5/2010 | Black | G06F 18/2321 |
| | | | 705/26.1 |

(Continued)

FOREIGN PATENT DOCUMENTS

| | | |
|---|---|---|
| DE | 102012103980 A1 | 11/2013 |
| DE | 102014014883 A1 | 4/2016 |

(Continued)

*Primary Examiner* — Molly Wilburn
(74) *Attorney, Agent, or Firm* — Schmeiser, Olsen & Watts LLP

(57) ABSTRACT

Provided is a method in which a processor (1) accesses a database which contains a set of data records containing a focus data record, (2) selects first data records from the set of data records, the first context information of which does not correspond to the first context information of the focus data record, and the second context information of which corresponds to the second context information of the focus data record, (3) lines up a focus graphic, (4) selects second data records from the set of data records, the first context information of which corresponds to the first context information of the focus data record, and the second context information of which does not correspond to the second context information of the focus data record, and (5) lines up second graphics.

25 Claims, 6 Drawing Sheets

(56) References Cited

U.S. PATENT DOCUMENTS

2017/0090742 A1\* 3/2017 Ade ................... G01B 21/047
2020/0326420 A1\* 10/2020 Swaminathan ......... G01S 13/89
2021/0325313 A1\* 10/2021 Kasavala ............. G01B 11/254

FOREIGN PATENT DOCUMENTS

DE   102018222519 A1   6/2020
WO       2020006335 A1   1/2020
WO       2018223038 A1   12/2021

\* cited by examiner

METHOD FOR AUTOMATICALLY ASSISTING WITH AN INSPECTION AND/OR CONDITION MONITORING OF OBJECTS

CROSS-REFERENCE TO RELATED APPLICATIONS

This application claims priority to DE Application No. 10 2020 216 401.0, having a filing date of Dec. 21, 2020, the entire contents of which are hereby incorporated by reference.

FIELD OF TECHNOLOGY

The following relates to a method for automatically assisting with an inspection and/or condition monitoring of objects.

BACKGROUND

In automobile manufacture, bodies are transported in fully automatic conveying systems. After body construction, they pass in this case through a painting system before they are supplied to the final assembly line.

The fully automatic conveying systems, for example in an assembly line, use assembly supports, to which the body is fixed as an object for assembly. The assembly supports are generally referred to as holders below and the objects for assembly are generally referred to as workpieces.

In addition to automobile manufacture and assembly processes in the stricter sense, embodiments of the invention generally relates to production systems, workshops and technical systems in which objects are subjected to an inspection and/or condition monitoring in order to determine and assess their actual condition. The objects may consequently be any desired components, parts, devices, machines, equipment, production means, subsystems, systems or functional units which need to be examined, for example with regard to temperature, vibration or positional deviations.

The position and orientation of an object are combined below under the term "pose". DIN EN ISO 8373 defines the term "pose" as a combination of the position and orientation of an object in three-dimensional space, which is predefined as the base coordinate system. The position of the object may be stated, for example, in three coordinates as the distance between its mass point and the origin of the base coordinate system. The orientation of the object may be described, for example, by virtue of a further coordinate system being spanned at its mass point, for the coordinate axes of which coordinate system an angular offset with respect to the respective axes of the base coordinate system is respectively indicated by means of three angle specifications. Different poses can be mapped to one another by means of translation and rotation.

According to DIN EN 13306 and DIN 31051, maintenance denotes a combination of measures which are used to obtain or restore a functional condition of an object. One of these measures is inspection which is used to determine and assess the actual condition of the object and to determine possible causes of impairments. The result of the inspection may involve identifying repair measures for the object, which are subsequently carried out. In this case, the term "object" denotes, for example, a component, a part, a device or a subsystem, a functional unit, an item of equipment or a system, which can be considered alone.

During condition monitoring, machine conditions are regularly or permanently captured by measuring and analyzing physical variables. For this purpose, sensor data are processed and are analyzed, in particular, in real time. Monitoring the machine condition enables condition-oriented maintenance.

Both functional failures of objects such as holders in production systems and their repair and preventative inspection and maintenance work are associated with high costs in manufacturing since they can result in a downtime of the respective manufacturing section.

SUMMARY

An aspect relates to automatically assist with an inspection and/or condition monitoring of objects.

A user-centered approach for automatically assisting with an inspection or condition monitoring is provided, which approach provides a visualization of sensor data by means of a special visualization concept which, with a multidimensional representation, enables a novel overview and a visual comparison of data which were previously available only as columns of numbers or isolated video images without a suitable context. This overview makes it possible to detect patterns which can be investigatively tracked, filtered according to criteria and finally attributed to possible causes. This means significant simplification, an increase in efficiency and a qualitative improvement for the maintenance engineer.

When searching for and determining faults, it is often only important whether a type of the deviation from sensor data is the same or different, for example when comparing different process steps, objects, times or other aspects of situations in which the objects are situated.

The user-centered approach enables a comparative inspection or condition monitoring with respect to those different categories which are broken down into two or three spatial axes and are presented for comparison.

BRIEF DESCRIPTION

Some of the embodiments will be described in detail, with reference to the following figures, wherein like designations denote like members, wherein:

FIG. 1 shows an object O, which is connected to a secondary object SO, in a target pose 1 and a scaled pose 2;

FIG. 2 shows a focus graphic 333 which alternately shows the object O shown in FIG. 1 in the target pose 1 and the scaled pose 2;

DETAILED DESCRIPTION

Figure 1:
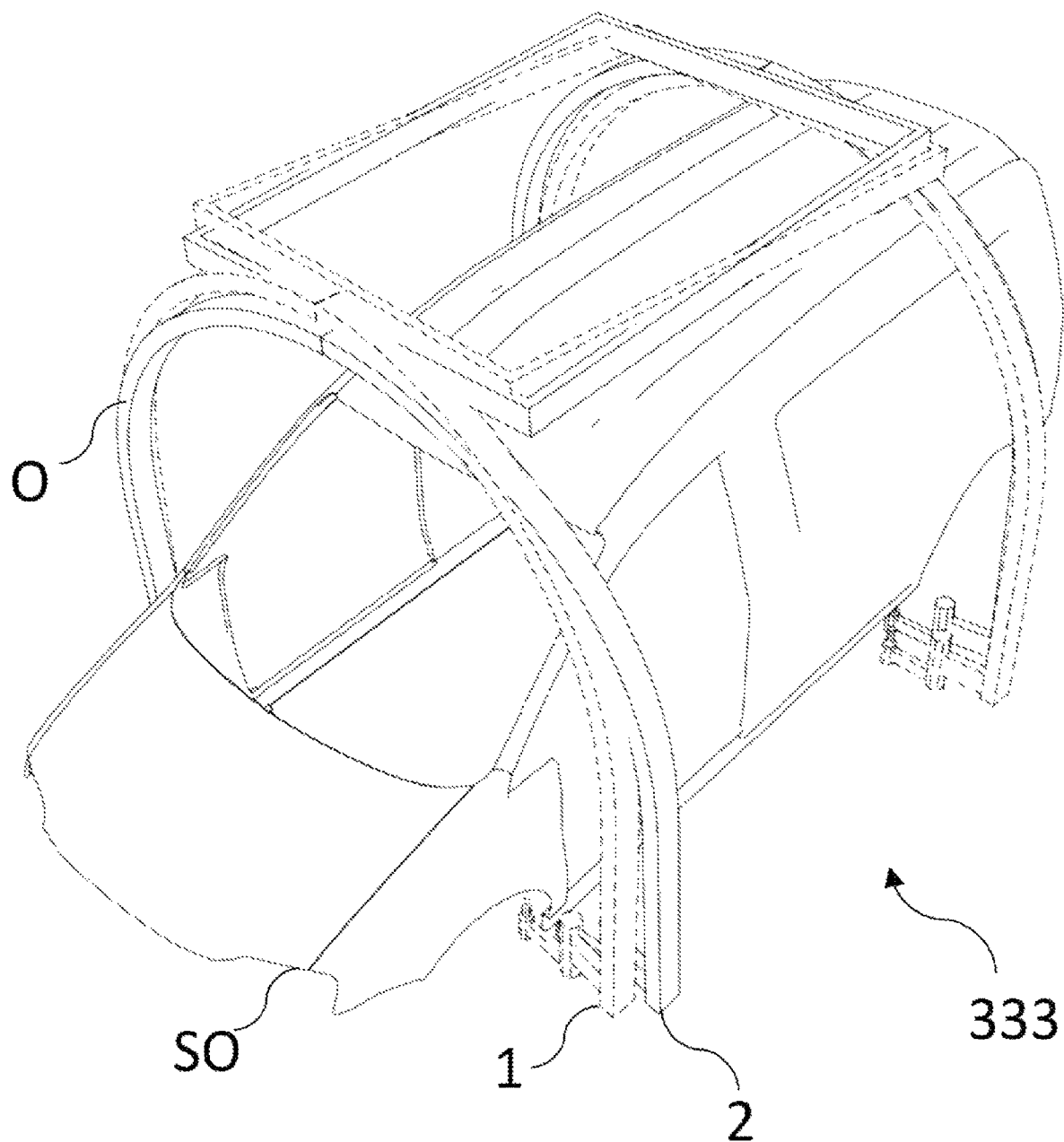

FIG. 1 shows an object O, which is connected to a secondary object SO, in a target pose 1 and a scaled pose 2.

The object O shown here is a holder with a workpiece as a secondary object SO. Specifically, the object O depicted is a suspension means which carries a body as a secondary object SO. Depending on the application, the workpiece itself may also be selected as the object O or the entire unit comprising the holder and workpiece can be considered to be the object O. Furthermore, the object O may also be of an entirely different type, for example a drive shaft.

The target pose 1 is, for example, a normalized pose which is expected and presupposed for the object O by a manufacturing station, to which the object O is supplied. In this case, the target pose 1 can be predefined, for example, by a design of the manufacturing station or can be measured in advance.

The intention is now to assist an engineer with carrying out an inspection and/or condition monitoring for the object. A focus graphic 333 advantageously shows the type and extent of a translation and/or rotation of the object O with respect to the target pose 1 to the engineer on the display.

For this purpose, an actual pose of the object O in the manufacturing station, which indicates the translation and/or rotation of the object with respect to the target pose 1, is first of all determined by means of sensors. Such sensors are often already installed in modern manufacturing stations since they enable fine adjustment of industrial robots. Camera-based systems in robot cells, which are passed through as manufacturing stations during automobile manufacture, thus measure the position and orientation of the object O in each robot cell in a fully automatic manner. It goes without saying that laser scanners, ultrasonic sensors, radar sensors or lidar sensors can also be used. All of the sensor types mentioned provide measured values, from which the actual pose of the object O can be directly gathered or at least calculated. For this purpose, the measured values are stored as raw values or, after suitable processing, initially as sensor data in a focus data record. Such data capture in technical systems such as workshops or production systems takes place continuously in the background in modern industrial cloud applications, with the result that the corresponding data records only have to be retrieved from the industrial cloud for evaluation. It is also advantageously possible here to continuously update the focus data record or other data records on the basis of new measurements during ongoing operation, which updating in turn updates the focus graphic. If appropriate, such updates may even be carried out in real time.

So that the type and extent of the deviation of the actual pose from the target pose 1 can be clearly seen on the display, the actual pose itself is not visualized by the focus graphic 333. This is because the actual deviation may only be a few millimeters or may be a very small angular deviation. Such a deviation would not be able to be seen in the focus graphic 333 if represented in a manner true to scale, but may be diagnostically very important during the inspection and/or condition monitoring. Therefore, a scaled pose 2 is calculated from the actual pose by virtue of the processor scaling the translation and/or rotation with respect to the target pose 1, for example by a factor of between 10 and 200, which is selected depending on the application. The focus graphic now alternately shows a graphical representation of the object O in the target pose 1 and a graphical representation of the object O in the scaled pose 2.

Figure 2:
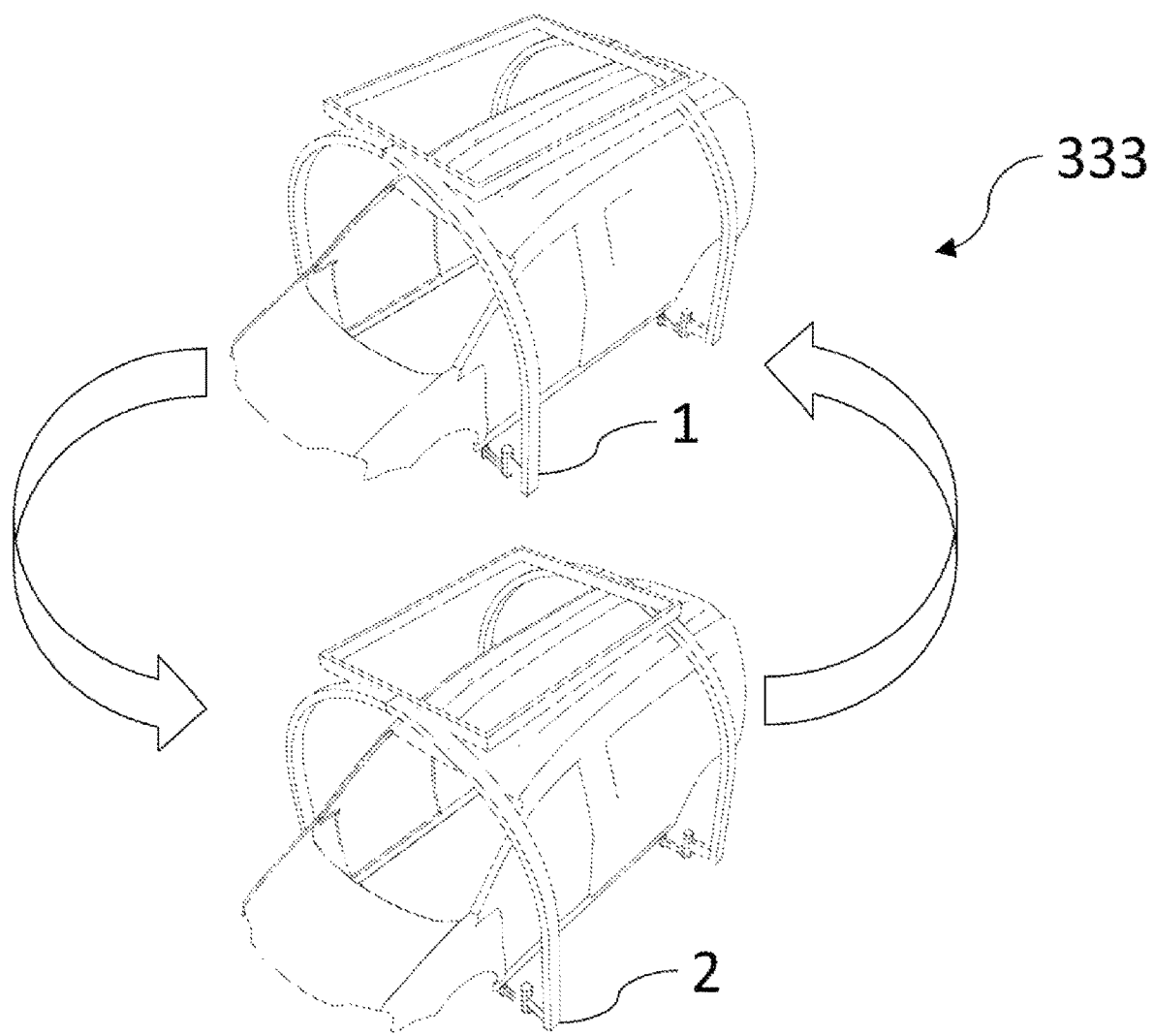

FIG. 2 shows a schematic illustration of the corresponding animation of the focus graphic 333.

The object O shown in FIG. 1 is alternately shown in the target pose 1 and the scaled pose 2. The two representations are superimposed, as depicted in FIG. 1, or displayed in alternation, with the result that the type and extent of the translation and rotation become immediately clear. The object O moves continuously back and forth between the target pose 1 and the scaled pose 2 in an animation, wherein the movement from one pose to the other lasts between 0.4 and 1.7 seconds, in particular between 0.8 and 0.9 seconds. The secondary object SO, shown in FIG. 1 as a body, can be concomitantly moved in this case.

It is particularly advantageous if the animation increasingly colors the object O during the movement to the scaled pose 2 on the basis of the extent of the translation and/or rotation. The object O—or additionally the secondary object SO as well—can thus be provided with a red color on one side during a rotation or translation as if it were to come dangerously close to a red light source in analogy to a fire. In this case, the opposite side may be provided with a blue color. This effect may also in turn be scaled, that is to say exaggerated. A large deviation of the actual pose from the target pose 1 is therefore already immediately discernible on the basis of the change in the color and color intensity of the focus graphic 333, thus considerably simplifying the comparison with other situations.

Figure 3:
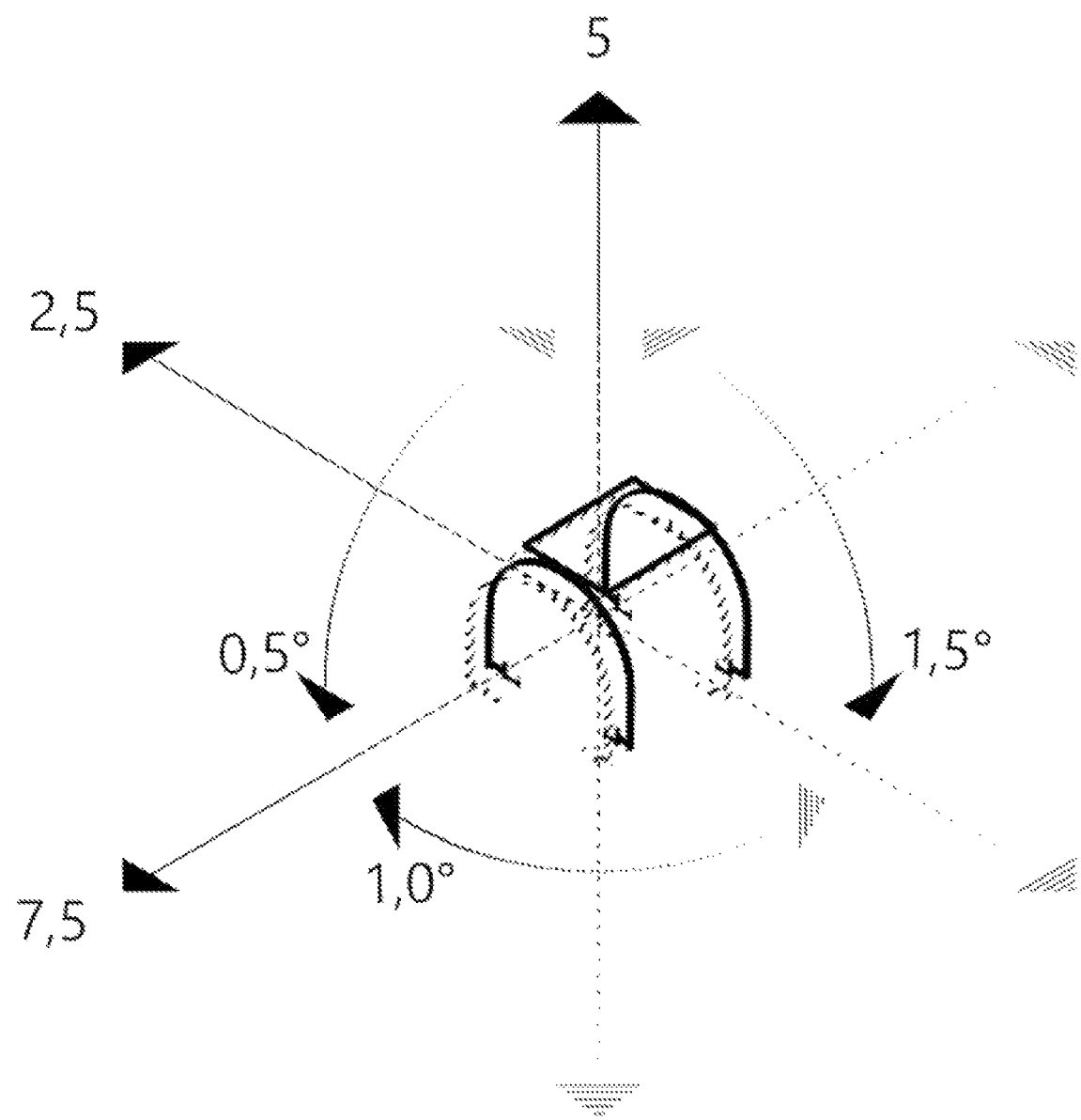
FIG. 3 shows another example of a focus graphic.

FIG. 3 shows another example of a focus graphic. The latter contains a display of deviations and corresponding values based on the three spatial axes, with respect to translation and rotation in each case. The graphics in the present exemplary embodiments can be augmented with arrows and numbers, as shown in FIG. 3.

In a generalization of the previous exemplary embodiments, the focus graphic shows only a deviation of the sensor data of the respective data record, here the focus data record, from a target condition. The degree of the deviation can be visualized, in particular, by means of coloration. The deviation need not be a translation or rotation, but rather could also be a deviation of temperatures or vibrations from a reference pattern, for example. Accordingly, a multiplicity of possible embodiments of the invention may also visualize entirely different sensor data, for instance temperature or vibration. Furthermore, the sensor data may also be visualized as absolute variables instead of as a deviation from a reference value.

The focus data record may therefore contain exhaust gas values, in the case of an exhaust gas analysis in a workshop, as sensor data for a motor vehicle as an object, or a temperature or vibrations as sensor data from an engine as an object, which is operated at full load in a workshop during an analysis.

The focus graphic advantageously represents the respective object, wherein the representation of the object is influenced by the sensor data or is overlaid or augmented with a representation of the sensor data.

For example, the focus graphic shows a thermal image of the respective object, which represents temperature measurements as sensor data. Corresponding sensor data can be captured, for example, by means of thermography, an imaging method for displaying the surface temperature of objects.

Alternatively, the focus graphic may show a vibration pattern of the respective object, which superimposes vibration measurements as sensor data on a representation of the object. For example, a multiplicity of vibration sensors may be arranged on a gas turbine as an object, the measured values from which sensors can be superimposed as color coding on an image-like representation of the gas turbine. Two-dimensional representations of vibrations on surfaces or inside machines can also be algorithmically extrapolated from measurements by individual sensors or can be captured by means of sensors using laser scanning vibrometry.

Furthermore, the focus graphic need not be moving, but rather may also be entirely motionless, wherein the sensor data can then be visualized by arrows or colors, for instance.

In this case, the respective sensor data can be updated continuously or even in real time, and the focus graphic may likewise be updated in real time.

All of the previously explained calculation and visualization possibilities for the focus graphic 333 apply in the same manner to the other graphics which are introduced below. All of the graphics explained below and shown in the figures therefore need not visualize a position and orientation and/or the deviation thereof, but rather may be configured according to the other exemplary embodiments mentioned. Furthermore, all graphics may be moving or motionless.

The important factor here is only that like is compared with like, for example thermal images with thermal images or vibration patterns with vibration patterns.

The prerequisite for the following exemplary embodiments is first of all a database which contains a set of data records also containing the focus data record explained above, wherein each data record from the set of data records contains, for a respective object from a set of objects, sensor data, which contain measured values of measurements by sensors on the respective object and/or data derived therefrom, and a first item of context information, a second item of context information and a third item of context information which characterize the respective object itself or a situation of the respective object at the time of the measurements on the respective object.

It goes without saying that the data records may also contain yet further context information. Furthermore, the data records and the database need not be present separately. It is completely sufficient if the data records are available as logical units, that is to say if the data associated with a respective data record can be immediately retrieved. The industrial cloud itself that was explained above may then also be considered to be the database, for example. Naturally, however, separate data records may also be held in a local database.

The set of data records is formed, for example, by storing, for each object, once or repeatedly, the sensor data after the respective measurements together with the first context information, the second context information and the third context information in a new data record. The data records can be updated continuously on the basis of new measurements by the sensors, as a result of which the graphics described in more detail below can also be updated continuously. This can also be carried out in real time.

For example, the first context information, the second context information and the third context information each mention
- a time of the measurements, or
- a location at which the measurements are carried out, in particular a manufacturing station such as a robot cell, or
- a type or serial number of the object, for example a suspension means number 81, or
- a type or serial number of a secondary object which was related to the object and, in particular, was mechanically connected to said object and/or acted on said object at the time of the measurements, for example a body of the four-door sedan type with a hatchback, or
- a type or serial number of one of the sensors.

Figure 4:
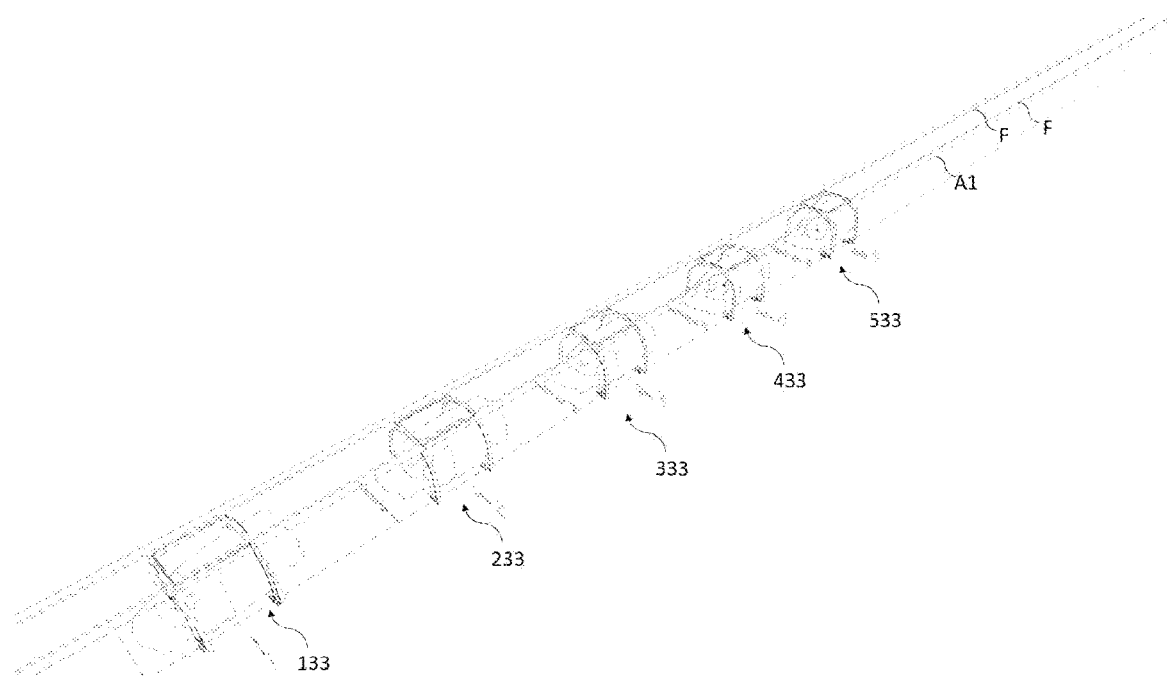
FIG. 4 shows first graphics 133, 233, 433, 533 which, in addition to the focus graphic 333, are lined up on a first axis A1 on a graphical user interface.

FIG. 4 now shows first graphics 133, 233, 433, 533 which are lined up, in addition to the focus graphic 333, on a first axis A1 on a graphical user interface.

For example, during an inspection or condition monitoring of the objects, which can also be carried out during ongoing operation, an engineer has brought an object into focus, which is represented by the focus graphic 333 in FIG. 4, by means of an initial user interaction, for example a tapping gesture on a touch display or a mouse click. This object is a suspension means no. 78 which is positioned along a production line in a third robot cell and carries a body of a type A. In addition to the sensor data which are provided from the third robot cell, the corresponding focus data record contains the following context information, for example:
Object number=78
Manufacturing station=3
Body type=A
Time=2020-12-21-23-59-59

In a first user action, the engineer selects from this context information, as first context information, the manufacturing station which thereby becomes a variable which is used for the further analysis. For the illustration shown in FIG. 4, first data records are now retrieved from the database, the first context information (manufacturing station) of which data records does not correspond to the first context information of the focus data record, while the other two items of context information (object number and body type) correspond to the focus data record.

For each of the first data records, an actual pose of the respective object, here always suspension means no. 78, is gathered or calculated from the respective sensor data (here as variables of the respective robot cell). As explained above, an associated scaled pose is calculated. The first graphics 133, 233, 433, 533 then show suspension means no. 78 on a first axis A1 along guides F in the different robot cells, wherein the first graphics alternately show graphical representations of suspension means no. 78 in the respective target pose and graphical representations of suspension means no. 78 in the respective scaled pose, as already explained above for the focus graphic 333. Suspension means no. 78 wobbles to a different extent on the graphical user interface, to the greatest extent in the first graphic 133 depicted on the front left for the first robot cell.

The engineer can now already distinguish the extent to which significant deviations can be attributed to suspension means no. 78 itself or the respective robot cell.

The first graphics 133, 233, 433, 533 can also represent the object over a longer period, for instance months or years, in the comparison, as a result of which gradual or creeping wear, for instance of rollers, can be discerned and evaluated.

Figure 5:
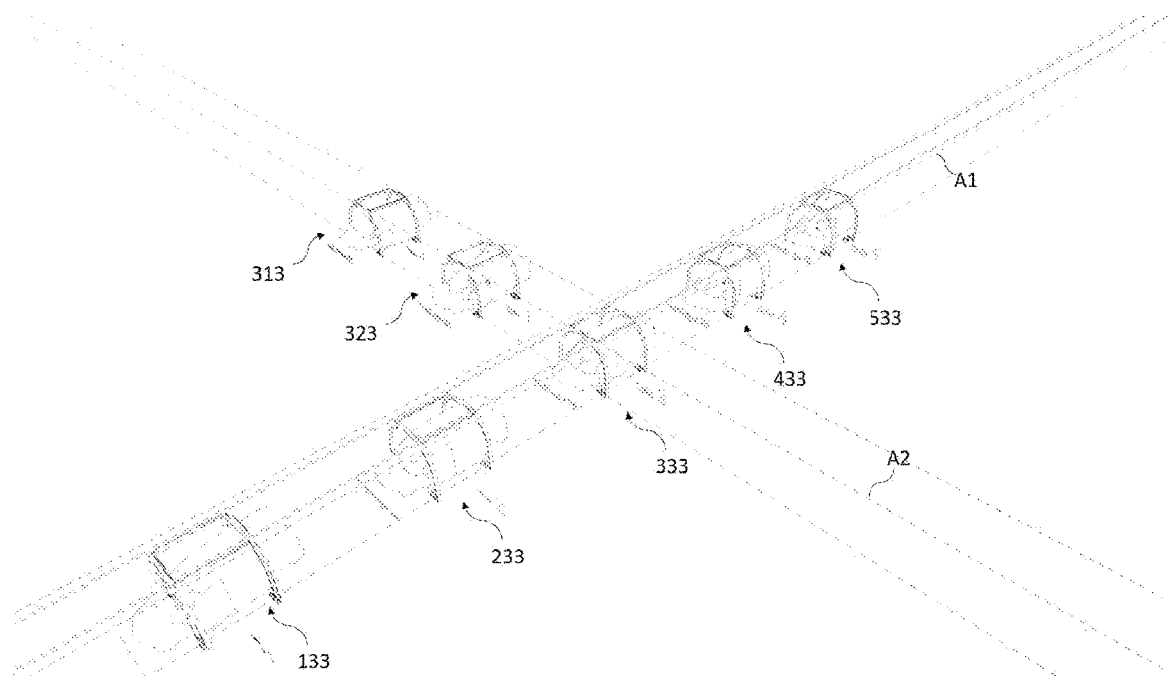
FIG. 5 shows second graphics 313, 323 which are lined up on a second axis A2 which intersects the first axis A1 at the position of the focus graphic 333.

FIG. 5 shows second graphics 313, 323 which are lined up on a second axis A2 which intersects the first axis A1 at the position of the focus graphic 333.

In this respect, in a second user action, the engineer has initially selected, as second context information, the suspension means itself which thereby becomes a variable which is used for the further analysis. For the illustration shown in FIG. 5, second data records are now retrieved from the database, the second context information (object number) of which data records does not correspond to the first context information of the focus data record, while the other two items of context information (manufacturing station and body type) correspond to the focus data record.

For each of the second data records, an actual pose of the respective object, here as variables of suspension means no. 36 and no. 81, is gathered or calculated from the respective sensor data of the third robot cell. As explained above, an associated scaled pose is calculated. The second graphics 313, 323 then show the different objects (suspension means) on a second axis A2, wherein the second graphics alternately show a graphical representation of the respective object in the respective target pose and a graphical representation of the respective object in the respective scaled pose, as already explained above for the focus graphic 333.

The second graphics 313, 323 are advantageously visually highlighted or displayed normally together with the focus graphic 333, while the first graphics 133, 233 are hidden or grayed out so that the engineer can concentrate on the comparison of the second graphics 313, 323 with the focus graphic 333.

The engineer can now already distinguish the extent to which significant deviations relate only to suspension means no. 78 itself or other suspension means in the third robot cell.

It goes without saying that the engineer can select any of the graphics shown at any time and can thereby bring them into focus, as a result of which the corresponding data record is selected as the focus data record.

Figure 6:
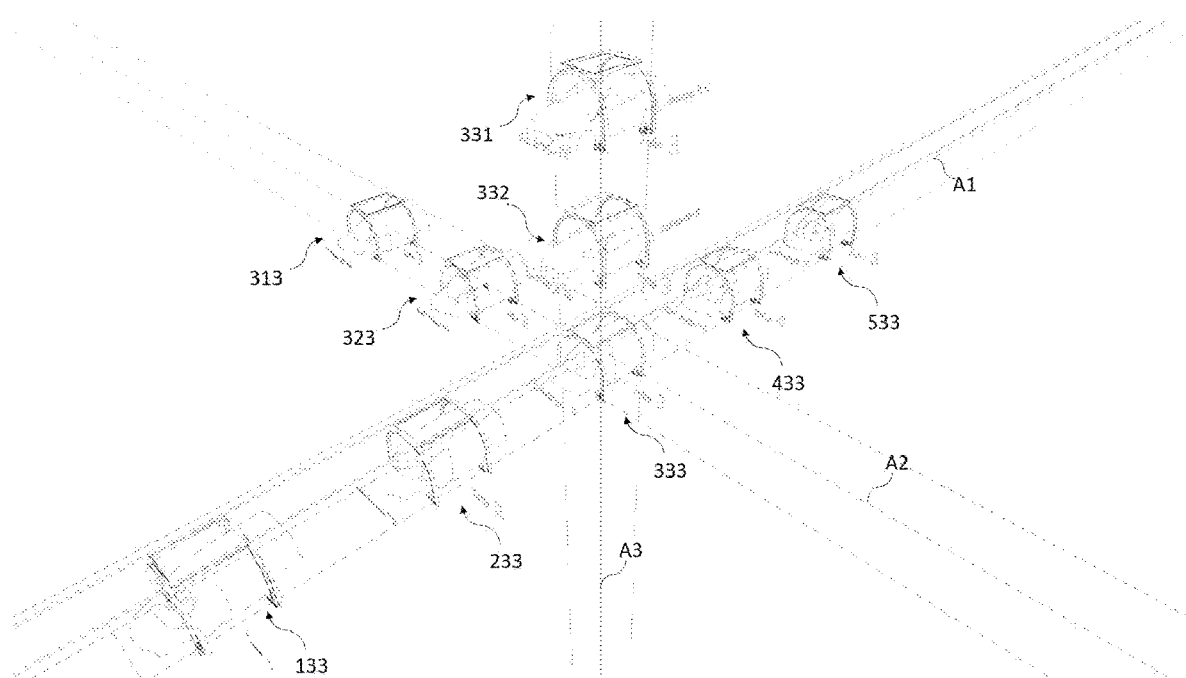
FIG. 6 shows third graphics 331, 332 which are lined up on a third axis A3 which intersects the first axis A1 and the second axis A2 at the position of the focus graphic 333.

FIG. 6 shows third graphics 331, 332 which are lined up on a third axis A3 which intersects the first axis A1 and the second axis A2 at the position of the focus graphic 333.

In this respect, in a third user action, the engineer has initially selected, as third context information, the type of secondary object, here the body, which thereby becomes a variable which is used for the further analysis. For the illustration shown in FIG. 6, third data records are now retrieved from the database, the third context information (body type) of which data records does not correspond to the first context information of the focus data record, while the other two items of context information (manufacturing station and object number) correspond to the focus data record.

For each of the third data records, an actual pose of suspension means no. 78 is gathered or calculated from the respective sensor data of the third robot cell. As explained above, an associated scaled pose is calculated. The third graphics 331, 332 then show suspension means no. 78 with different secondary objects (the body type B and the body type C) on a third axis A3, wherein the third graphics alternately show a graphical representation of suspension means no. 78 in the respective target pose and a graphical representation of suspension means no. 78 in the respective scaled pose, as already explained above for the focus graphic 333.

The third graphics 331, 332 are advantageously visually highlighted or displayed normally together with the focus graphic 333, while the first graphics 133, 233, 433, 533 and the second graphics 313, 323 are hidden or grayed out so that the engineer can concentrate on the comparison of the third graphics 331, 332 with the focus graphic 333.

The engineer can now distinguish the extent to which significant deviations at suspension means no. 78 in the third robot cell relate only to a particular body type or to all body types equally. In the situation shown in FIG. 6, suspension means no. 78 containing the body type C in the upper third graphic 331 noticeably differs greatly from the target pose.

FIG. 6 therefore shows a diagram, in the center of which there is a holder with a workpiece, to be precise in a particular situation, here in a particular manufacturing process step, at a time selected by the engineer as part of the analysis. For this purpose, in the comparison, other holders with identical types of workpieces are shown on the second axis A2 and the same holder with different types of workpieces is shown on the third axis A3, both in the same process step in each case which is carried out in the third robot cell.

In the event of disruptions, for example dimensional deviations, the engineer can see on the graphical user interface whether these disruptions occur only in a particular process step, only in the case of a particular holder or only in the case of a particular type of workpiece, or whether they are repeated in other process steps, holders or workpieces.

The target pose may be identical in each case for different objects, manufacturing stations and secondary objects or may be specific to the respective object, the respective manufacturing station or the respective secondary object. The actual pose is always defined as a deviation from the associated target pose and is therefore diagnostically meaningful. As explained above, all graphics in all exemplary embodiments may also represent other sensor data, for instance temperature or vibration, in which case a deviation from a reference value need not be shown either in each case.

If more first data records, second data records or third data records are found than can be clearly displayed on the graphical user interface, only a selection is shown. The engineer can filter the respective data records further, if necessary, using suitable operating elements.

The graphics may additionally contain arrows, numbers, labels or other symbols.

The focus graphic 333 is arranged in the center of the first axis A1, the second axis A2 and the third axis A3, wherein the focus graphic 333, the first graphics 133, 233, 433, 533, the second graphics 313, 323 and the third graphics 331, 332 are arranged in an equidistant manner on the respective axis.

The first axis A1, the second axis A2 and the third axis A3 are orthogonal to one another and are represented by a projection onto the graphical user interface. The projection is a central projection, in particular a two-vanishing point perspective, or an isometric parallel projection.

The isometric parallel projection has the advantage that it does not comprise any distortion.

Therefore, raster graphics generated in advance can be used for the graphics.

Figure 7:
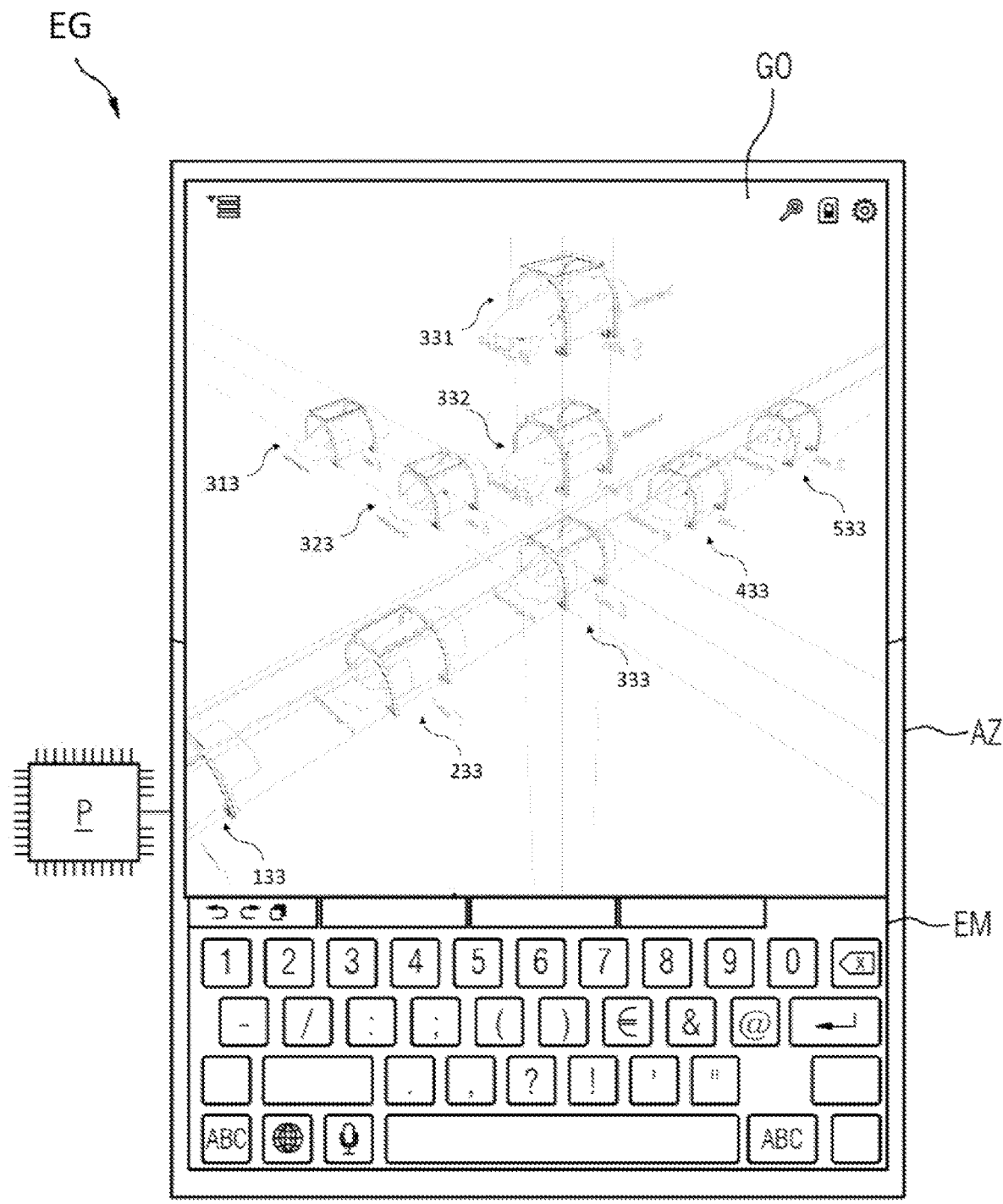
FIG. 7 shows a terminal EG having a processor P, an input means EM and a display AZ which is configured to output a graphical user interface GO.

FIG. 7 shows a terminal EG having a processor P, an input means EM and a display AZ which is configured to output a graphical user interface GO.

The input device EM is, for example, a virtual keyboard on a touchscreen, a mechanical keyboard, a mouse, a trackpad or an apparatus for voice input or gesture control.

The processor P is, for example, a microprocessor or a microcontroller, a system-on-chip or a programmable digital module, for instance a "Field Programmable Gate Array" (FPGA).

The terminal EG is, for example, a notebook, a smartphone, a tablet, AR glasses, VR glasses or a PC.

The display AZ is, for example, a screen or a projector which outputs a two-dimensional image or a three-dimensional image. The three-dimensional image may be output stereoscopically, for example.

The processor P may be arranged in the terminal EG or in a server. It may carry out the method steps explained above on its own, in alternation or in parallel with other processors.

For example, the processor P may be arranged in the terminal and, as the main or graphics processor, can itself render the graphics explained above. For the rendering, the processor P can process code which is written in a Web3D description language, in order to present the graphics in a three-dimensional manner, and is embedded in HTML code which is received from a server.

The graphics can be rendered as two-dimensional raster graphics which are optionally stored in the associated data records.

Alternatively, the processor P may be arranged in a server and may render the graphics explained above therein. In this case, the graphics may also be converted into two-dimensional raster graphics which are optionally stored in the associated data records. Furthermore, the rendered graphics can be transmitted to the terminal EG for display, for example by means of a remote desktop or by means of an interactive video stream. In this case, the entire graphical user interface GO may also be transmitted from the server to the terminal EG, in particular. The server may also have suitable interfaces for accessing the database. The same applies to the terminal EG if the calculations are carried out in the terminal.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automatically assisting with an inspection and/or condition monitoring of objects, the method comprising:
    accessing, by a processor, a database which contains a set of data records containing a focus data record, wherein each data record from the set of data records contains, for a respective object from a set of objects:
        sensor data containing measured values from measurements by sensors on the object and/or data derived therefrom, and
        a first item of context information, a second item of context information and a third item of context information each characterizing the object itself or a situation of the object at the time of the measurements on the object;
    selecting, by the processor, first data records from the set of data records, wherein:
        the first context information of which does not correspond to the first context information of the focus data record, and
        the second context information of which corresponds to the second context information of the focus data record,
    lining up, by the processor, a focus graphic, which represents the sensor data of the focus data record, and first graphics, each representing the sensor data of one of the first data records in each case, on a first axis on a graphical user interface;
    selecting, by the processor, second data records from the set of data records, wherein:
        the first context information of which corresponds to the first context information of the focus data record, and
        the second context information of which does not correspond to the second context information of the focus data record; and
    lining up, by the processor, second graphics, each representing the sensor data of one of the second data records in each case, on a second axis on the graphical user interface, which intersects the first axis at the position of the focus graphic.

2. The method as claimed in claim 1,
in which the database is in a memory connected to the processor or in a cloud, and/or
in which the processor, a further processor or a plurality of processors receives(s), for each object, once or repeatedly, the sensor data after the respective measurements and store(s) them together with the first context information, the second context information and the third context information in the respective data record, thus forming the set of data records in the database.

3. The method as claimed in claim 1,
in which the data records are updated continuously on a basis of new measurements by the sensors, and
in which the focus graphic, the first graphics and/or the second graphics is/are updated continuously in order to represent the updated sensor data,
wherein the updates are carried out in real time, in particular.

4. The method as claimed in claim 1,
in which the objects are components, parts, devices, machines, equipment, production means, subsystems, systems and/or functional units, and/or
in which the first context information, the second context information and the third context information each indicate:
a time of the measurements, or
    a location at which the measurements are carried out, in particular a manufacturing station, or
a type or serial number of the object, or
    a type or serial number of a secondary object which was related to the object and was mechanically connected to the object and/or acted on the object at the time of the measurements, or
a type or serial number of one of the sensors.

5. The method as claimed in claim 1, in which
the first data records and the second data records are selected in such a manner that the third context information corresponds to the third context information of the focus data record,
the processor or a further processor selects third data records from the set of data records,
    the first context information of which corresponds to the first context information of the focus data record,
    the second context information of which corresponds to the second context information of the focus data record, and
    the third context information of which does not correspond to the third context information of the focus data record, and
the processor or a further processor lines up third graphics, each representing the sensor data of one of the third data records in each case, on a third axis on the graphical user interface, which intersects the first axis and the second axis at the position of the focus graphic.

6. The method as claimed in claim 5,
in which the processor or a further processor:
    evaluates an initial user interaction which selects the focus data record from the set of data records, and/or
    evaluates a first user interaction which selects the first context information from a set of context information stored in the focus data record, and/or
    evaluates a second user interaction which selects the second context information from the set of context information, and/or evaluates a third user interaction which selects the third context information from the set of context information.

7. The method as claimed in claim 5,
in which the processor or a further processor:
renders the focus graphic, the first graphics, the second graphics and/or the third graphics and then stores the first graphics, the second graphics and/or the third graphics in the respective data records, or
retrieves the first graphics, the second graphics and/or the third graphics from the respective data records, or
retrieves the first graphics, the second graphics and/or the third graphics from a server which renders the first graphics, the second graphics and/or the third graphics and/or keeps the first graphics, the second graphics and/or the third graphics in a memory.

8. The method as claimed claim 5,
in which the focus graphic, the first graphics, the second graphics and/or the third graphics contain arrows, numbers and/or other symbols.

9. The method as claimed in claim 5,
in which the focus graphic, the first graphics, the second graphics and/or the third graphics
are three-dimensional and are described, in particular, by code of a Web3D description language, or
are two-dimensional raster graphics which are animated and/or appear in a three-dimensional manner.

10. The method as claimed in claim 5,
in which the focus graphic is arranged in the center of the first axis, the second axis and the third axis, and/or
in which the focus graphic, the first graphics, the second graphics and/or the third graphics are arranged in an equidistant manner on the respective axis.

11. The method as claimed in claim 5,
in which the first axis, the second axis and the third axis are orthogonal to one another and are represented by a projection onto the graphical user interface,
wherein the projection is a central projection, in particular a two vanishing point perspective, or an isometric parallel projection.

12. The method as claimed in claim 5,
in which the focus graphic, the first graphics, the second graphics and/or the third graphics in each case visualize(s) a deviation of the sensor data of the respective data record from a target condition, wherein the degree of deviation is visualized by means of coloration, and/or is/are animated.

13. The method as claimed in claim 5,
in which the focus graphic, the first graphics, the second graphics and/or the third graphics represent(s) the respective object, wherein the representation of the object
is influenced by the sensor data and/or
is overlaid and/or augmented with the representation of the sensor data.

14. The method as claimed in claim 5,
in which the focus graphic, the first graphics, the second graphics and/or the third graphics
show(s) a thermal image of the respective object, which represents temperature measurements, or
show(s) a vibration pattern of the respective object, which visually represents vibration measurements, or
show(s) a positional deviation of the respective object, which visually represents measurements of the position and/or orientation.

15. The method as claimed in claim 5, in which
the processor or a further processor creates the focus graphic, the first graphics, the second graphics and/or the third graphics by respectively:
gathering or calculating an actual pose of the respective object from the sensor data in the respective data record, which actual pose indicates a translation and/or rotation with respect to a target pose of the respective object,
calculating a scaled pose of the respective object from the actual pose of the respective object by virtue of the processor scaling the translation and/or rotation with respect to the target pose of the object,
wherein each graphic is moving and alternately shows a graphical representation of the respective object in the target pose of the respective object and a graphical representation of the respective object in the scaled pose of the respective object, and
wherein the scaling is selected in such a manner that a deviation of the actual pose of the respective object from the target pose of the respective object, which is diagnostically relevant to the inspection and/or condition monitoring, are clearly seen on the graphical user interface.

16. The method as claimed in claim 15,
in which the respective object is a holder which holds a workpiece,
in which the respective object is a workpiece which is held by a holder, or
in which the object consists of a holder and a workpiece, wherein the holder holds the workpiece.

17. The method as claimed in claim 16,
in which the holder is a suspension means, and/or
in which the workpiece is a body.

18. The method as claimed in claim 15,
in which the scaling is selected in such a manner that a direction of the translation and/or rotation are clearly seen by scaling the translation by a factor of between 10 and 200, and by scaling the rotation by a factor of between 10 and 200.

19. The method as claimed in claim 15,
in which each graphic shows an animation in which the respective object continuously moves back and forth between the target pose of the respective object and the scaled pose of the respective object, wherein the movement from one pose to the other lasts between 0.4 and 1.7 seconds.

20. The method as claimed in claim 19,
in which the animation increasingly colors the respective object during the movement to the scaled pose of the respective object on a basis of the extent of the translation and/or rotation.

21. A terminal for automatically assisting with an inspection and/or condition monitoring of objects, the terminal comprising:
at least one processor programmed to carry out the method as claimed in claim 1;
a display configured to output the graphical user interface; and
an interface configured to access the database.

22. A server for automatically assisting with an inspection and/or condition monitoring of objects, the server comprising:
at least one processor programmed to carry out the method as claimed in claim 1; and one or more interfaces configured to access the database and to transmit the graphical user interface to a terminal having a display.

23. The server as claimed in claim 22,
in which the processor is programmed to transmit the graphical user interface to the terminal:
by means of a remote desktop,
by means of an interactive video stream, or
   by means of HTML code in which code of a Web3D description language is embedded on a basis of which the focus graphic, the first graphics, the second graphics and/or the third graphics is/are rendered on the terminal.

24. A non-transitory computer-readable data storage medium comprising a computer program which carries out the method as claimed in claim 1 when executed in a processor.

25. A computer program product, comprising a non-transitory computer readable storage having instructions which, when executed by a processor process, carries out the method as claimed in claim 1.

\* \* \* \* \*